United States Patent [19]

Fujitaka et al.

[11] Patent Number: 5,541,712
[45] Date of Patent: Jul. 30, 1996

[54] DOCUMENT PRESSING DEVICE FOR A COPIER

[75] Inventors: Junichi Fujitaka, Isehara; Kenji Ishii, Tokyo; Akira Akada, Osaka, all of Japan

[73] Assignees: Ricoh Company, Ltd., Tokyo; Simotec Inc., Osaka, both of Japan

[21] Appl. No.: 541,429

[22] Filed: Oct. 10, 1995

[30] Foreign Application Priority Data

Oct. 11, 1994 [JP] Japan .................................. 6-244969

[51] Int. Cl.⁶ .................................................. G03G 21/00
[52] U.S. Cl. ........................................... 355/231; 355/75
[58] Field of Search ............................. 355/231, 75, 230

[56] References Cited

U.S. PATENT DOCUMENTS 4,523,831  6/1985  Yokoo et al. ...................... 355/231
5,003,347  3/1991  Kameda ................................. 355/75

*Primary Examiner*—Nestor R. Ramirez
*Attorney, Agent, or Firm*—Oblon, Spivak, McClelland, Maier & Neustadt, P.C.

[57] ABSTRACT

In a copier, a document pressing device has a holder member pivotally engaged with a base member at its base end. A bracket is pivotally connected to the other end of the holder member by a shaft. An inner sleeve has its bottom pivotally engaged with a lug formed on the base member and positioned closer to a glass platen than the base end of the holder member. An outer sleeve has its bottom pivotally connected to the free end of the bracket and positioned closer to the glass platen than the point about which the bracket is pivotable. When a relatively thick document is laid on the glass platen, the device allows a cover for pressing the document to be smoothly lifted up or returned to its original position. The device, therefore, enhances the manipulability of the cover plate.

4 Claims, 17 Drawing Sheets

DOCUMENT PRESSING DEVICE FOR A COPIER

BACKGROUND OF THE INVENTION

The present invention relates to a document pressing device for a copier and, more particularly, to a document pressing device having a hinge mechanism capable of holding a cover for pressing a document at any desired angular position, and allowing it to be lifted up when the document is relatively thick.

It has been customary with a document pressing device for the above application to hinge the base end of a cover to the housing of a copier by a right and a left hinge mechanism or by a single center hinge mechanism. The hinge mechanism or mechanisms are constructed to hold the cover at any desired open position or angle, and to lift up the cover when a relatively thick document is to be copied. This kind of document pressing device is disclosed in, e.g., Japanese Patent Laid-Open Publication Nos. 4-19532 and 6-194748.

However, the conventional devices have some problems yet to be solved, as follows. When the cover is closed, its base end rises and prevents the cover from being stably closed. This occurrence is usually referred to as hip-up. Further, when a document to be copied is relatively thick, the cover cannot cover the document unless the operator presses it against the document with a considerable force, resulting in low manipulability. Moreover, when the cover is lifted up or restored to its original position, the force required of the operator is irregular and causes the operator to feel uneasy. In addition, the range in which the cover can be held at a desired angle, i.e., a free stop range is limited.

SUMMARY OF THE INVENTION

It is, therefore, an object of the present invention to provide a document pressing device for a copier and capable of lifting up a cover or restoring it smoothly when the cover presses a relatively thick document, thereby enhancing the manipulability of the cover.

It is another object of the present invention to provide a document pressing device for a copier and capable of obviating the hip-up of a cover in the event of ordinary closing operation, and returning the cover from a lift-up position to the original position.

It is still another object of the present invention to provide a document pressing device for a copier and capable of freeing the operator from uneasy feelings when a cover is lifted up or restored to the original position due to irregularities in required operating force.

It is a further object of the present invention to provide a document pressing device for a copier and capable of broadening the lift-up range of a cover with a minimum of spring force, and intensifying the pressure to be exerted by the cover on a document so as to facilitate the copying operation.

A document pressing device for a copier of the present invention has a cover disposed above a document table of the copier, and for pressing a document laid on the document table. At least one hinge mechanism is provided at the base end of the cover, and openably supports the cover on the housing of the copier. The hinge mechanism has a holder member pivotally engaged at its base end with a base member mounted on the housing. A bracket is pivotally connected to the other end of the holder member. A first hollow cylindrical sleeve member has a bottom, and is pivotally engaged at the bottom with a portion of the base member closer to the document table than the base end of the holder member. A second hollow cylindrical sleeve member has a bottom, and is telescopically coupled over the first sleeve member, and is pivotally engaged with or connected to the free end of the bracket such that the second sleeve member is positioned closer to the document table than a point about which the bracket is pivotable. A plurality of lugs are formed at the open end of the outer periphery of one of the first and second sleeve members, and slidably contacts the inner periphery of the other of the sleeve members. A notch is formed in one of the first and second sleeve members from the open end toward the bottom over a predetermined length. A first biasing member is loaded between the bottoms of the first and second sleeve members, and constantly biases the first and second sleeves away from each other. A second biasing member is loaded between the bracket and the holder member, and constantly biases the bracket toward the holder member such that when the cover is moved toward or away from the document table, the bracket does not pivotally move about the point relative to the holder member. An engaging and disengaging device is constituted by of the bracket and a part of the holder member. The engaging and disengaging device causes the bracket engage with the holder member such that the bracket is movable together with the holder member, and causes, when a relatively thick document is laid on the document table, the bracket to disengage from the holder member when the bracket is pivotally moved about the point in interlocked relation to the closing movement of the cover and then released from the holder to cause the cover to be lifted up in accordance with the thickness of the document.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
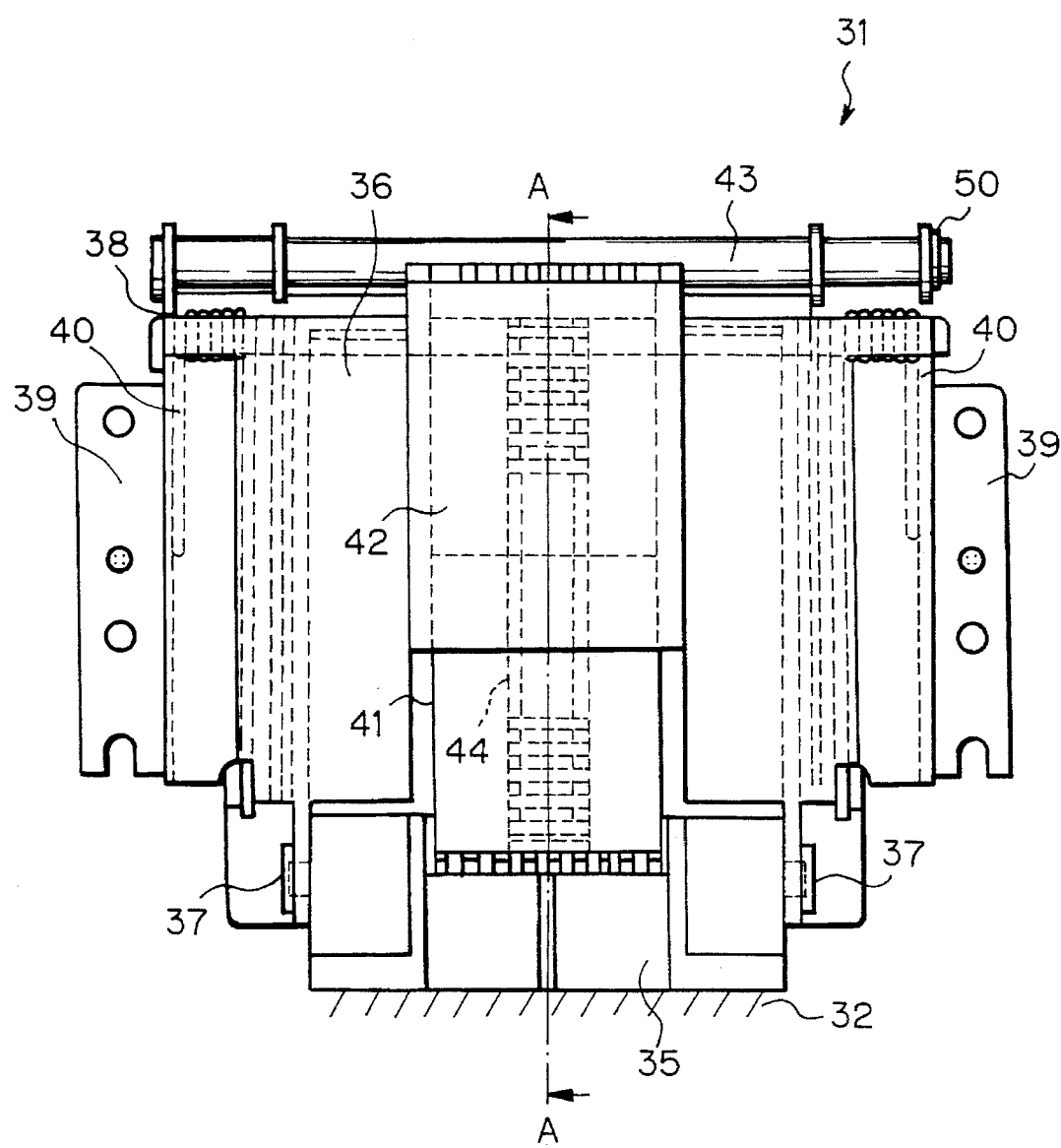
FIG. 1 is a front view showing a document pressing device embodying the present invention, particularly a hinge mechanism thereof, in a condition wherein a cover is fully opened.

To better understand the present invention, a brief reference will be made to a conventional document pressing device for a copier, shown in FIGS. 14 and 15. The device to be described is of the type taught in previously mentioned Japanese Patent Laid-Open Publication No. 4-19532 by way of example. As shown, the copier has a housing 1 to which a base member 2 is affixed. A support member 4 is pivotally supported by the base member 2 and movable in the direction in which a cover 3 is opened and closed. A compression spring 5 is loaded between the support member 4 and the base member 2 and constantly biases the member 4 in the opening direction. A hinge pin 6 is studded on the free end of the support member 4 while a crank member 7 is rotatably supported by the pin 6. Pins 9 and 11 are studded on opposite ends of the crank member 7. A telescopic guide member 8 supports the spring 5 and is engaged with the pin 9. The cover 3 is affixed to a bracket 10 which is rotatably supported by the pin 11.

Figure 14:
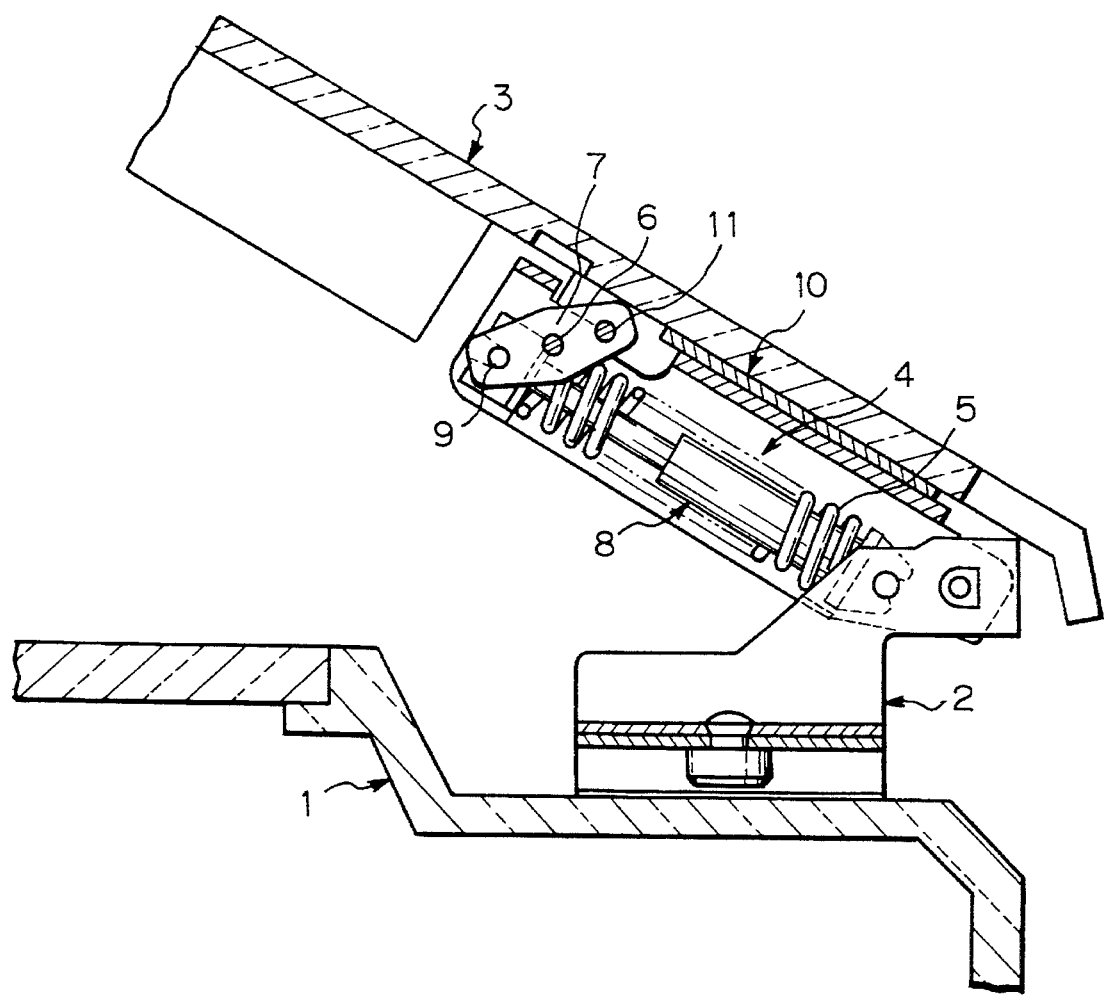
FIGS. 14 and 15 are sectional side elevations each showing a conventional document pressing device in a particular condition.

As shown in FIG. 14, when the cover 3 is opened, the crank member 7 constantly biased by the spring 5 is rotated about the hinge pin 6 to a position where the bracket 10 engages with the support member 4. When the operator's hand is released from the cover 3, the cover 3 is brought to a stop at a position where the torque acting around the hinge pin 6 and the force of the coil spring 5 counteracting it are balanced.

Figure 15:
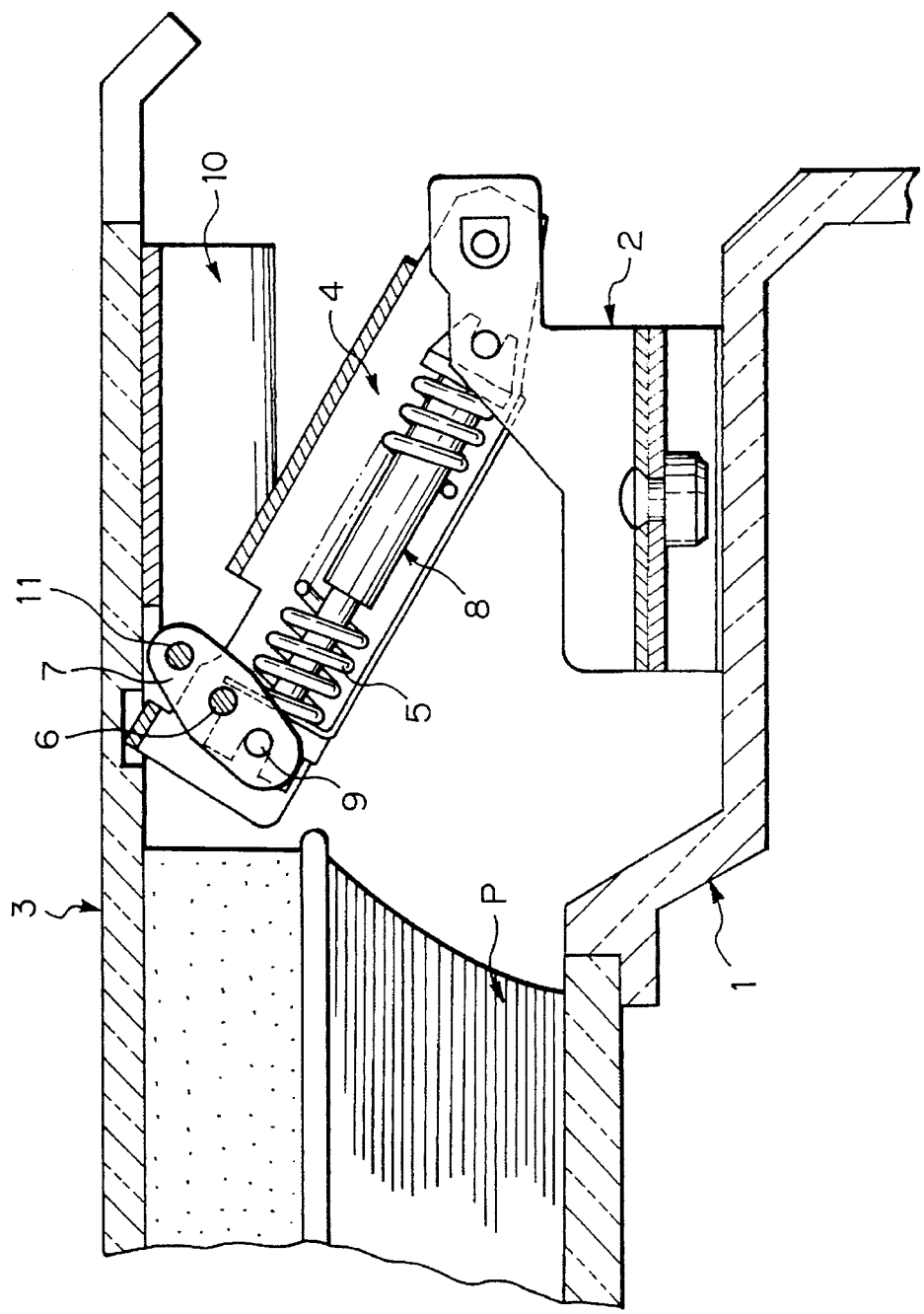

As shown in FIG. 15, when a book or similar thick document P is laid on the copier, the cover 3 is rotated, or lifted up, about the hinge pin 6 against the force of the spring 5. As a result, the cover 3 covers the document P in a horizontal position.

The problem with the prior art device described above is that when the cover 3 is closed, its base end rises because the support member 4 is engaged with the bracket 10 only by the force of the spring 5. The rise, or hip-up, of the cover 3 prevents the bracket 10 from being surely engaged with the support member 4 and thereby prevents the cover 3 from remaining in its closed position stably. Hip-up may be obviated if the force of the spring 5 is increased. However, when the document is thick, this kind of scheme forces the operator to exert a force great enough to overcome the force of the spring 5 in the event of closing of the cover 3.

Figure 16:
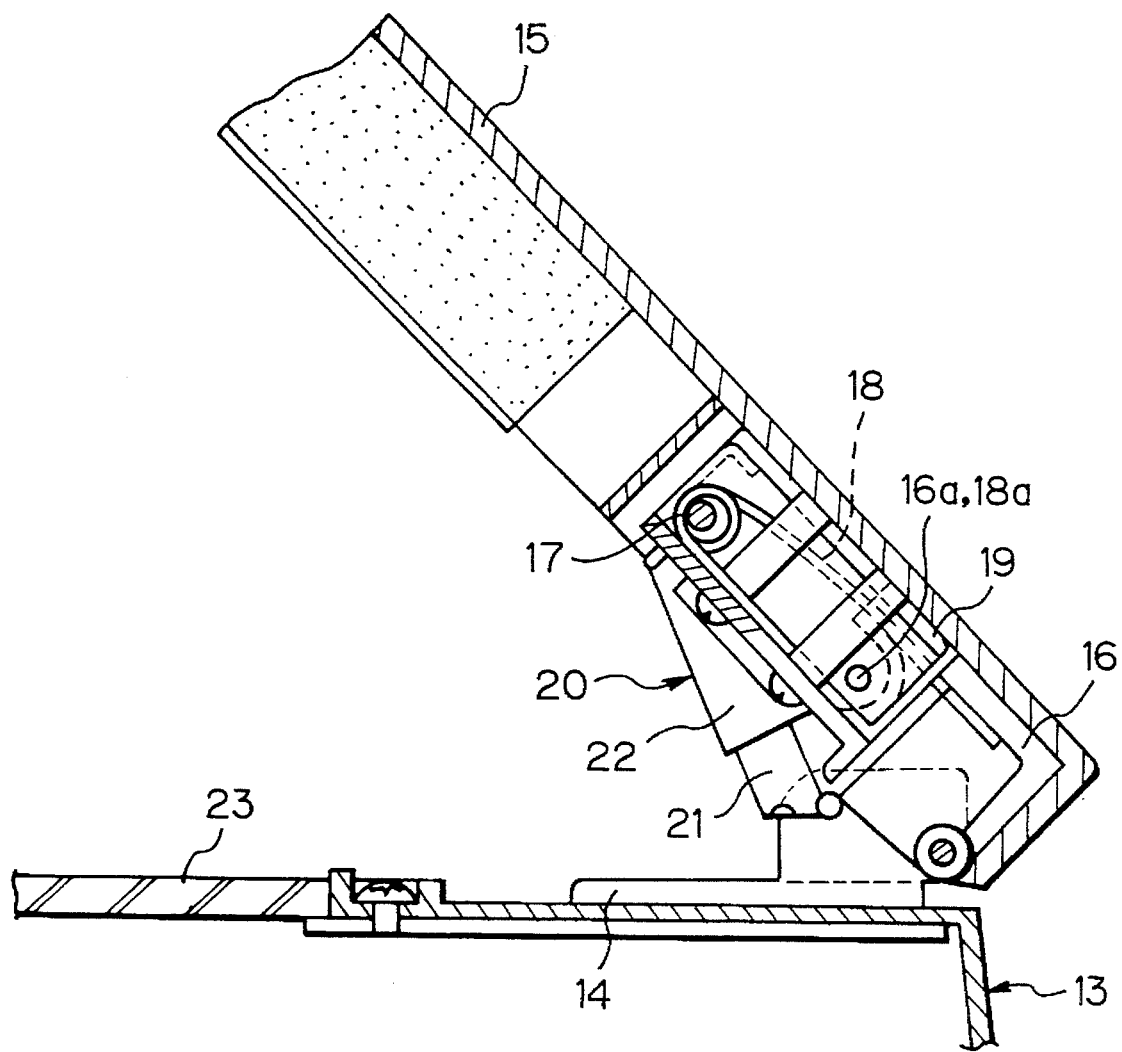
FIGS. 16 and 17 are sectional side elevations each showing another conventional document pressing device in a particular condition.
Figure 17:
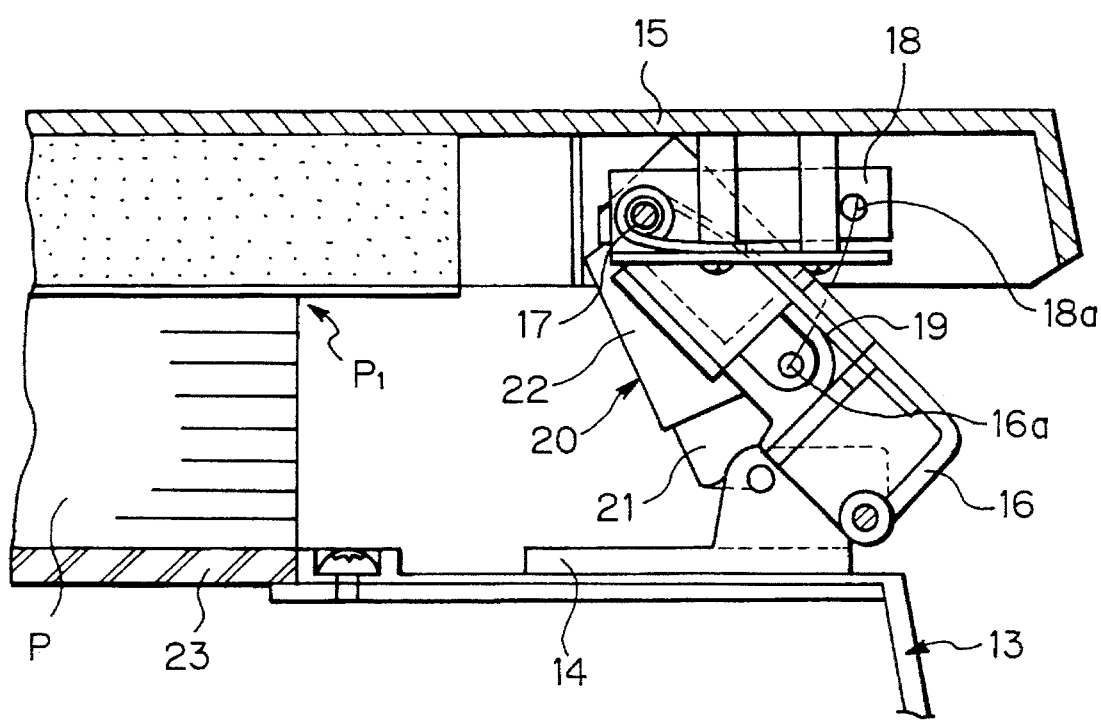

FIGS. 16 and 17 show another conventional document pressing device disclosed in, e.g., Japanese Patent Laid-Open Publication No. 6-194748. As shown, a copier has a housing 13 to which a base member 13 is affixed. A holder member 16 is pivotally supported by the base member 14 at its base end and movable in the direction in which a cover 15 is opened and closed. A bracket 18 is affixed to the cover 15 and rotatably connected to the end of the holder member 16 by a shaft 17. A torsion spring 19 is loaded between the holder member 16 and the bracket 18 and constantly biases the bracket 18 such that it rotates about the shaft 17 clockwise, as viewed in FIGS. 16 and 17, relative to the holder member 16.

A telescopic guide member 20 is positioned between the base member 14 and the shaft 17. The guide member 20 is made up of an inner sleeve 21, an outer sleeve 22, and a coil spring, not shown. The inner sleeve 21 is connected to the base member 14 at its bottom. The outer sleeve 22 is coupled over the inner sleeve 21 from the open end of the sleeve 21 and is connected to the shaft 17 at its bottom. The coil spring is loaded between the bottoms of the sleeves 21 and 22. A lug 18a is formed on the bracket 18 and received in a hole 16a formed in the holder member 16. The lug 18a and hole 16a connect the holder member 16 to the bracket 18.

As shown in FIG. 16, when the cover 15 is opened, the holder member 16 and bracket 18 are rotated about the bracket 17 away from a glass platen 23 under the action of the spring 19 with the lug 18a and hole 16a mating with each other. As a result, the spring disposed between the sleeves 21 and 23 is extended with the sleeves 21 and 22 sliding on each other. When the cover 15 is released at a desired angular position, it is held stationary due to the balance between the moment of rotation acting toward the glass platen 23 and attributable to the weight of the cover 15 and the force of the spring disposed in the sleeves 21 and 22 and friction between the sleeves 21 and 22.

When the cover 15 is closed, the holder member 16 and bracket 18 are moved toward the glass platen 23 about the shaft 17 with the lug 18a and hole 16a mating with each other. At the same time, the spring in the sleeves 21 and 22 is compressed. In this manner, because the lug 18a and hole 16a remain in engagement with each other, the cover 15 can be stably brought onto the glass platen 23 without any hip-up.

As shown in FIG. 17, assume that a book or similar thick document P is laid on the glass platen 23. Then, when a predetermined portion of the cover 15 abuts against one edge P1 of the document P, the cover 15 is bodily rotated toward the glass platen 23 about the edge P1. As a result, the hole 16a of the holder 16 is released from the lug 18a of the bracket 18, so that the bracket 18 is brought into close contact with the document P about the shaft 17.

As stated above, the device shown in FIGS. 16 and 17 prevents the bracket 18 from rotating about the shaft 17 relative to the holder member 16 when the cover 15 is opened and closed, relying on the force of the torsion spring 19 and the engagement of the lug 18 and hole 16a. However, because the outer sleeve 22 and bracket 18 are supported by a single shaft 17, the moment of rotation acting on the bracket 18 about the shaft 17 is great if the cover 15 is heavy. To cope with this movement, the force of the spring 19 and the force for maintaining the lug 18 and hole 16a in engagement must be increased. Consequently, when the document is thick, the cover 15 cannot be closed unless a great force is exerted thereon. This is undesirable from the manipulability standpoint.

The cover 15 is prevented from rotating by the lug 18 and hole 16a mating with each other. This brings about the following problem. Assume that after the cover 15 has been lifted up, the bracket 18 is rotated toward the holder member 18 about the shaft 17 in order to restore the cover 15 to its original position. Then, the lug 18a of the bracket 18 is caught by the side of the holder member 16, obstructing the smooth return of the cover 15. This is because the lug 18a engageable with the hole 16a is simply formed on the bracket 18. Therefore, an implementation for allowing the bracket 18 to be easily returned to the holder member 16 is desired.

When the lug 18a is brought into or out of engagement with the hole 16a, it slides on the side of the holder member 16 while pressing the member 16. As a result, the holder member 16 elastically deforms and increases the distance between its side and the lug 18a. This prevents the lug 18a from fully mating with the hole 16a or from fully leaving it, resulting in irregularities in engaging force and disengaging force. Hence, the force necessary for the operator to lift up the cover 15 or restore it is not constant and causes the operator to fee uneasy. This is also true when the lug and hole are respectively formed in the holder 16 and bracket 18.

Furthermore, the cover 15 is held at a desired angular position due to the balance between the moment of rotation acting toward the glass platen 23 and attributable to the weight of the cover 15 and the force of the spring disposed in the sleeves 21 and 22 and friction between the sleeves 21 and 22, as stated earlier. With this configuration, it is impracticable to broaden the angular range in which the cover 15 can be held at a desired position, i.e., a free stop range. Specifically, when the usual opening angle of the cover 15 is small, a great moment of rotation acts on the cover 15 and requires the spring of the sleeves 21 and 22 to exert a great force. When the usual opening angle is great, the moment acting on the cover 15 is small and reduces the force required of the spring. In this sense, the force for freely stopping the cover 15 at a desired position varies along a hyperbolic curve. By contrast, the force of the spring of the sleeves 21 and 22 varies linearly. This is why the free stop range available with the above device is extremely limited. When the force of the spring is increased in order to broaden the free stop range, it prevents the cover 15 from being smoothly opened and closed.

Figure 2:
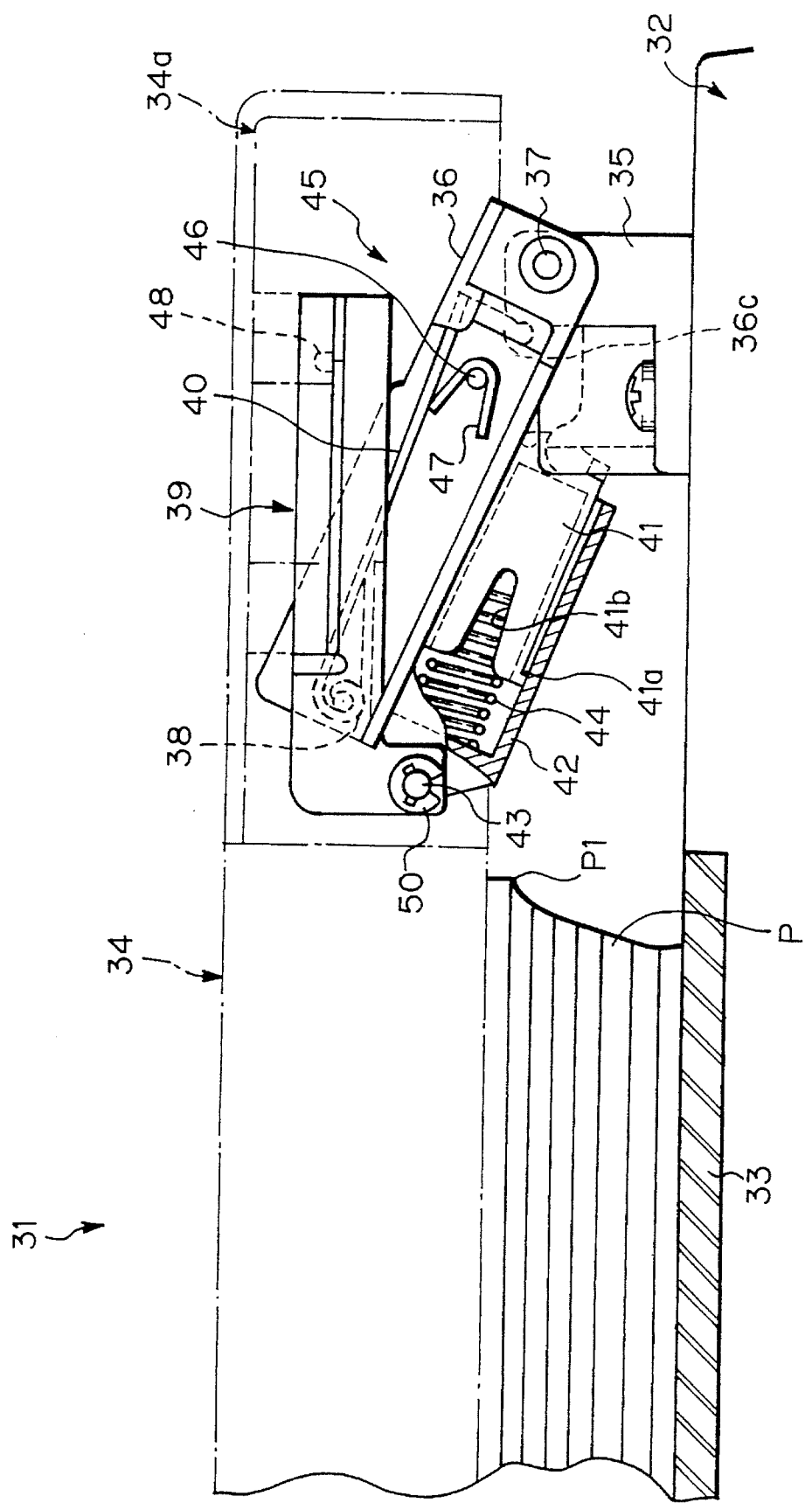
FIG. 2 is a side elevation showing the hinge mechanism in a condition wherein the cover is lifted up.
Figure 3:
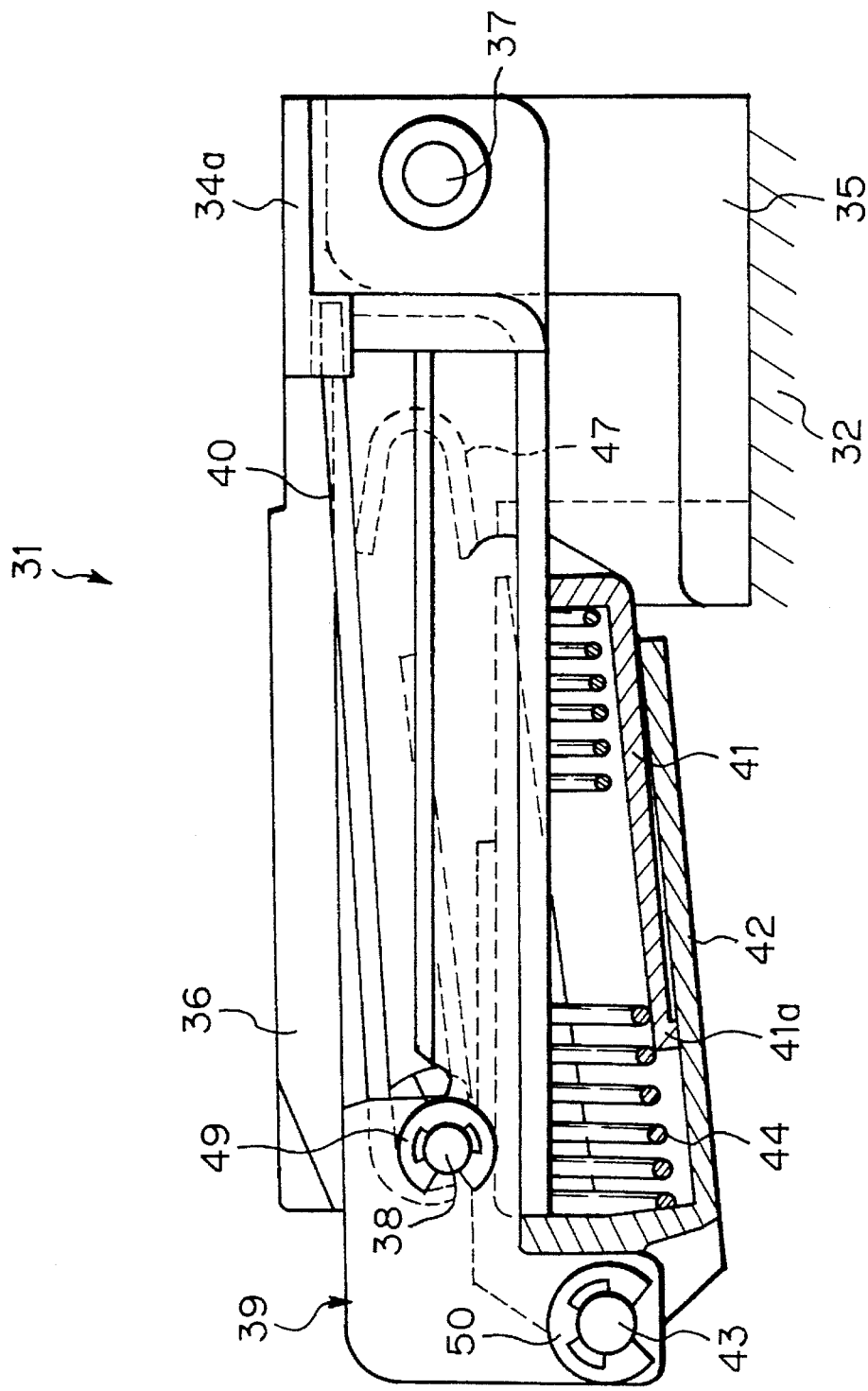
FIG. 3 is a side elevation showing the hinge mechanism in a condition wherein the cover is fully closed.

Referring to FIGS. 1–13, a document pressing device embodying the present invention will be described. As shown in FIGS. 1–3, a hinge mechanism 31 is located outward of one edge of a glass platen 33 mounted on the top of a copier housing 32. A cover 34 for pressing a document is pivotally supported by the housing 32 at its base end 34a. The hinge mechanism 31 is interposed between the cover 34 and the housing 32.

A base member 35 is affixed to the housing 32 outside of the glass platen 32. A holder member 36 has its base end pivotally connected to the base member 35 by a boss 37. A pair of brackets 39 are each pivotally connected to the free end of the holder 36 at its predetermined portion by a shaft 38. The brackets 39 are, therefore, pivotally movable about the shaft 38. Alternatively, the brackets 39 may be connected to the holder member 36 by bosses. The cover 34 is fastened to the bracket 39 by screws or similar fastening means and pivotable about the boss 37 together with the holder member 36. A torsion spring, or second biasing means, 40 is loaded between the holder member 36 and the bracket 39. The spring 40 constantly biases the bracket 39 clockwise, as viewed in FIGS. 2 and 3, such that the bracket 39 tends to engage with the holder member 36.

Figure 6:
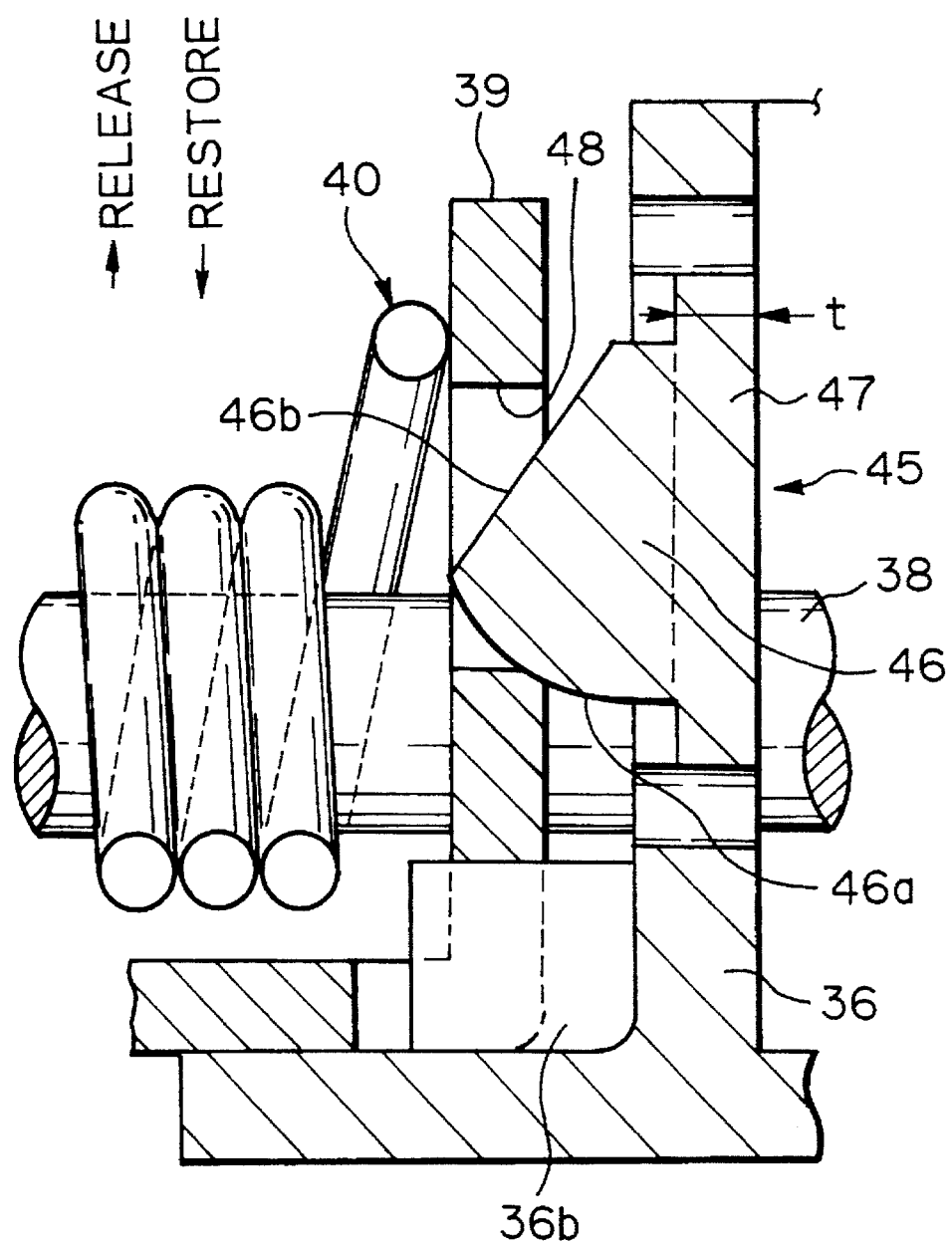
FIG. 6 is a section along line B—B of FIG. 4.
Figure 7:
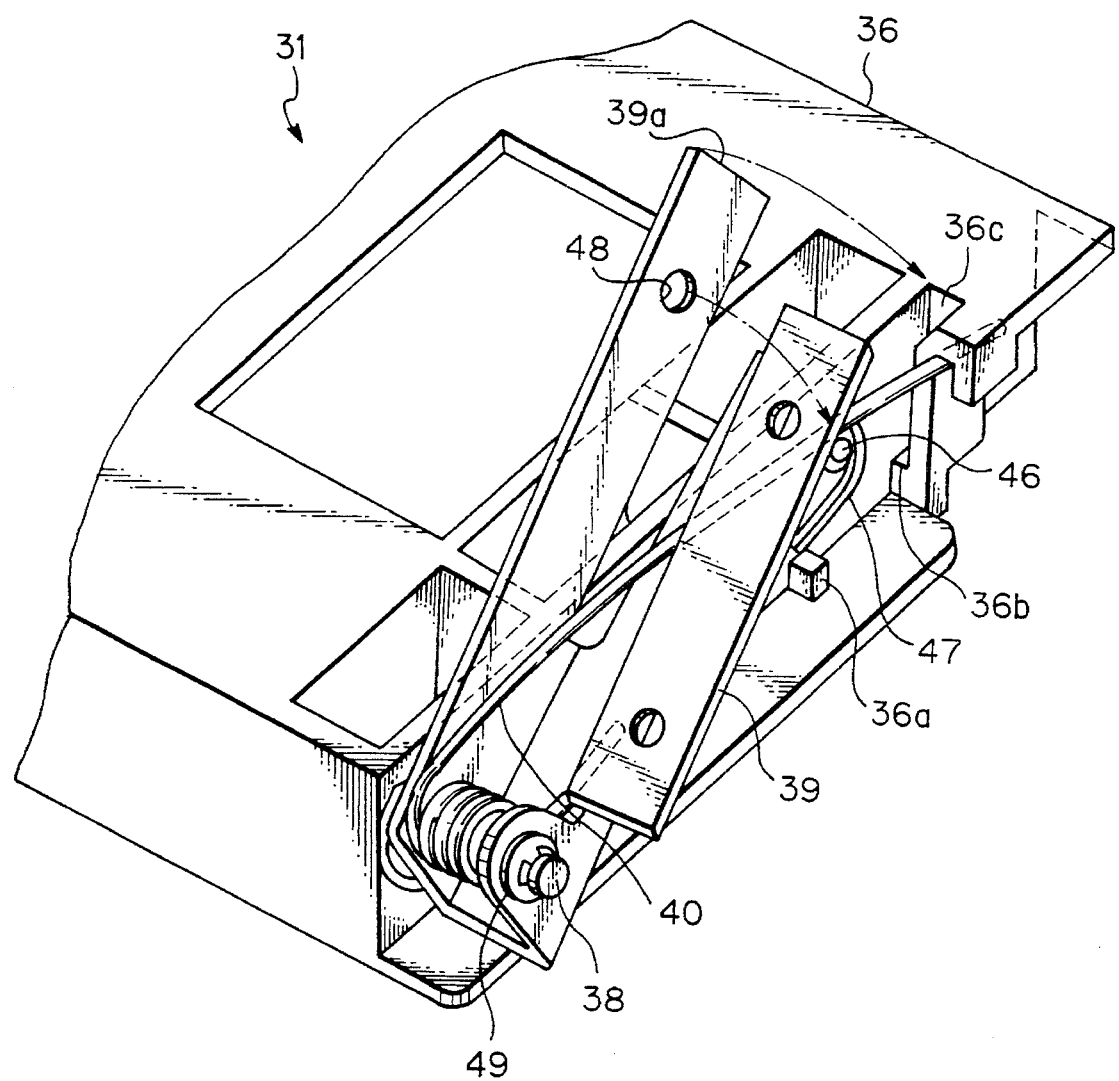
FIG. 7 is a perspective view showing a bracket released from a holder member.
Figure 8:
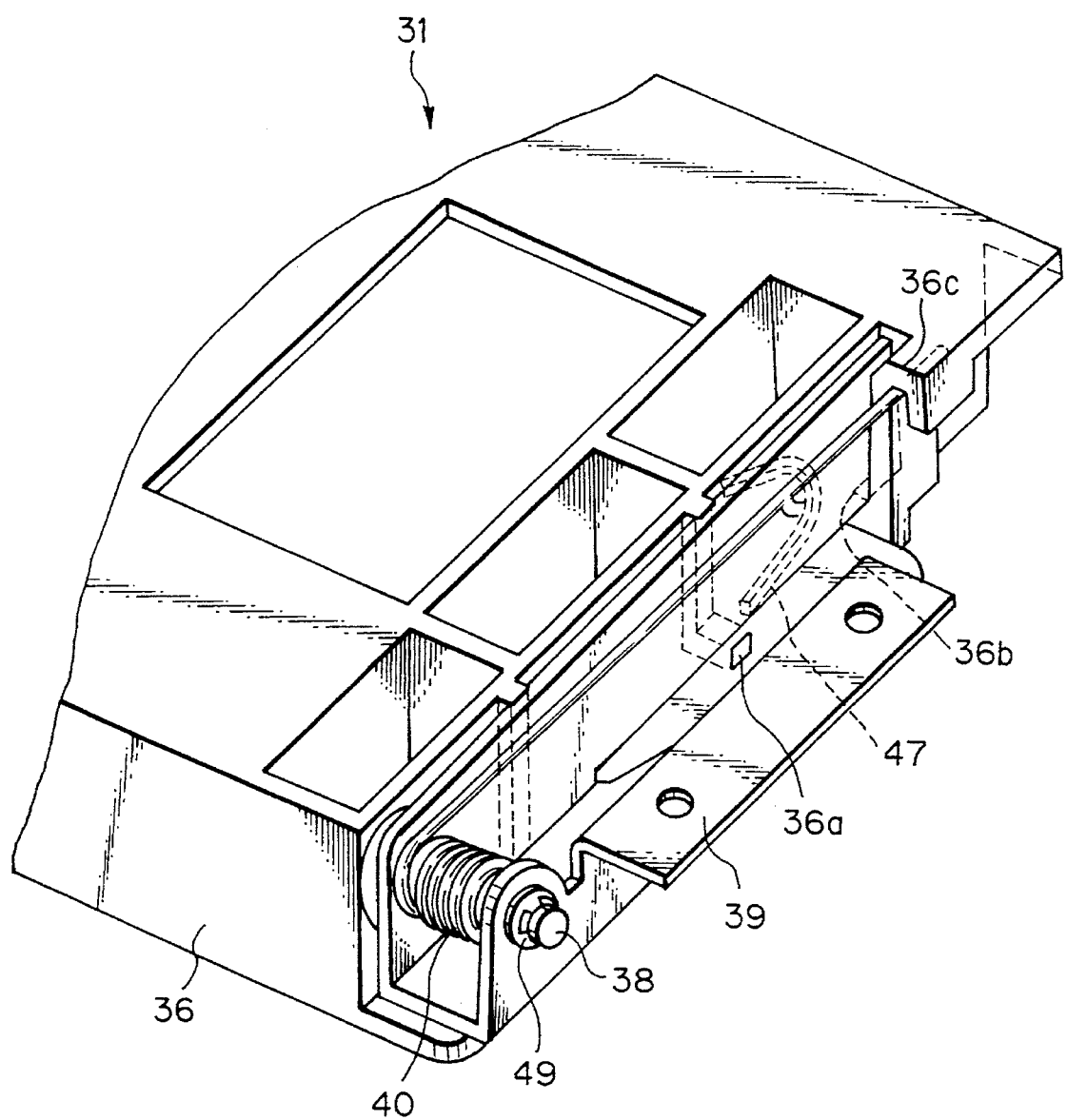
FIG. 8 is a perspective view showing the bracket engaged with the holder member.

As shown in FIGS. 6–8, the holder member 36 is formed with stops 36a and 36b. The stops 36a and 36b limit the rotation of the bracket 39 in the clockwise direction, as viewed in FIGS. 2 and 3, and thereby maintain it substantially collinear with the holder member 36. In FIG. 6, the bracket 39 is shown as limiting the movement of the holder member 36 to the front as seen in the direction perpendicular to the sheet surface of FIG. 6.

As shown in FIGS. 1–3, an inner sleeve, or first sleeve member, 41 is engaged with the base member 35 and implemented as a bottomed hollow cylinder. The inner sleeve 41 is positioned such that its bottom is located closer to the glass platen 33 than the base end of the holder member 36. An outer sleeve, or second sleeve member, 42 is telescopically coupled over the inner sleeve 41 and also implemented as a bottomed hollow cylinder. The bottom of the outer sleeve 42 is pivotally connected to a shaft 43. The ends of the brackets 39 are also pivotally connected to the shaft 43. Specifically, the outer sleeve 42, as well as the ends of the brackets 39, is connected to the shaft 43 at a position closer to the glass platen 33 than the shaft 38 about which the brackets 39 are rotatable. The sleeves 41 and 42 are formed of resin.

Figure 4:
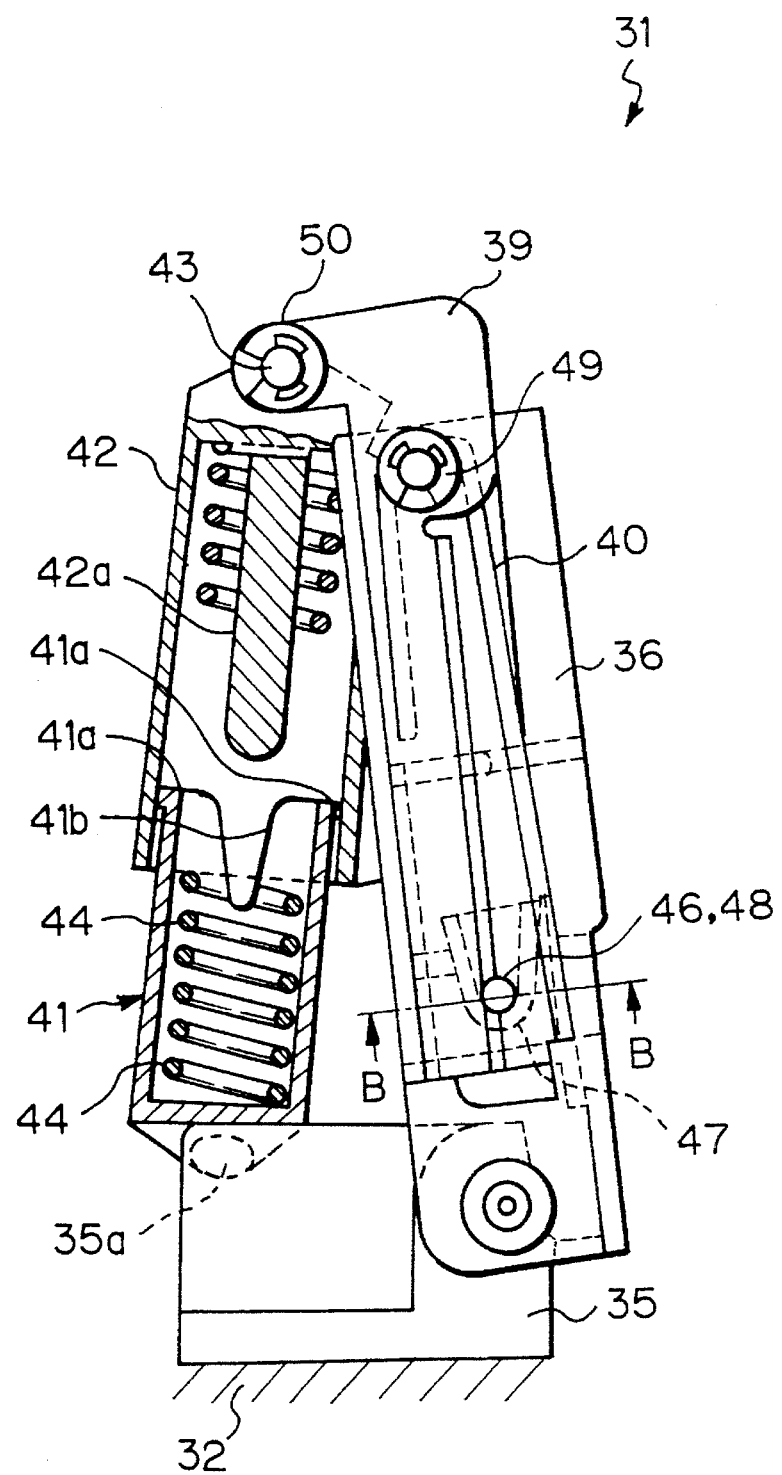
FIG. 4 is a side elevation of the hinge mechanism and showing only an inner and an outer sleeve in a section along line A—A of FIG. 1.
Figure 5:
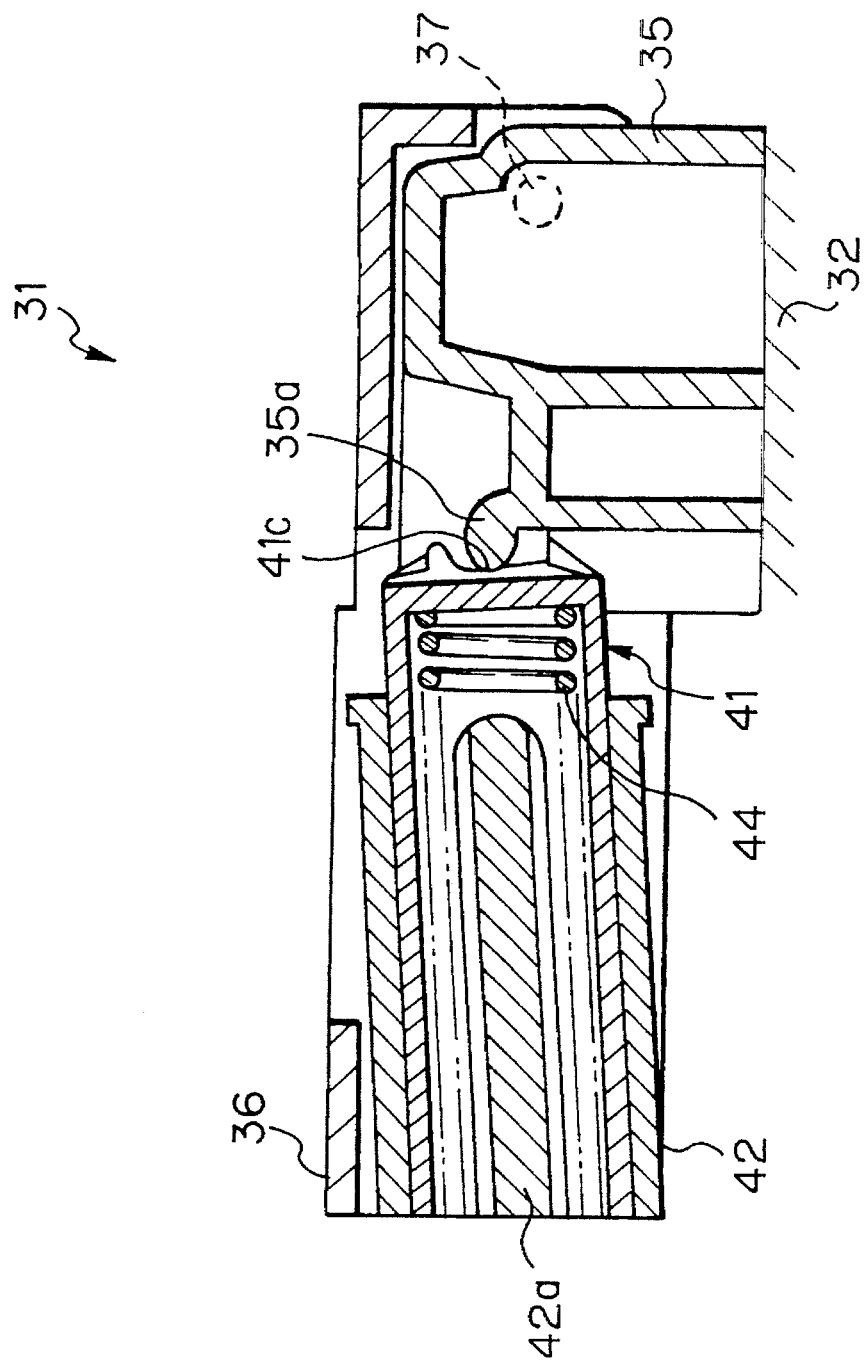
FIG. 5 shows a relation between the inner sleeve and a base member.

As shown in FIGS. 4 and 5, a guide shaft 42a extends from the inner periphery of the outer sleeve 42. A compression spring, or first biasing means, 44 is loaded between the bottom of the inner sleeve 41 and the bottom of the outer sleeve 42. The spring 44 constantly biases the bottoms of the sleeves 41 and 42 away from each other. In this condition, the ends of the brackets 39 are constantly biased in the clockwise direction as viewed in FIGS. 4 and 5.

The inner sleeve 41 has a plurality of (two in the embodiment) lugs 41a at the open end of its outer periphery. The lugs 41a are received in the outer sleeve 42. A slot 41b extends from the open end of the sleeve 41 over a predetermined distance. The inside diameter of the sleeve 42 is sequentially reduced from the open end to the bottom. In this configuration, when the cover 34 is closed while causing the bottoms of the sleeves 41 and 42 to approach each other, the slot 41b is narrowed. At this instant, the force of the lugs 41a sliding on the sleeve 42 and, therefore, the friction between the sleeves 41 and 42 increases. When the cover 34 is opened while causing the sleeves 41 and 42 to move away from each other, the slot 41b is broadened. At this time, the force of the lugs 41a sliding on the sleeve 42 and, therefore, the friction between the sleeves 41 and 42 decreases.

Regarding the positional relation between the point (boss 37) where the holder 36 and base member 35 are connected, the point where the sleeve 41 and base member 35 are engaged, and the point (shaft 43) where the sleeve 42 and shaft 43 are connected, the point where the sleeve 41 and base member 35 are engaged is positioned above a line connecting the boss 37 and shaft 43. Hence, the force of the spring 44 loaded between the sleeves 41 and 42 serves to press a document laid on the glass platen 33. As a result, the document is held in close contact with the glass platen 33 and eliminates defective copies, e.g., one in which the trace of folds are reproduced.

As shown in FIG. 5, the base member 35 has a flat lug 35a on its surface engaging with the bottom of the sleeve 41. The lug 35a is longer in the horizontal direction (substantially parallel to the glass platen 33) than in the vertical direction, as seen in a section. The bottom of the sleeve 41 has a recess 41c on its surface engaging with the lug 35a. The recess 41c is provided with a curvature equal to or greater than the curvature of the lug 35a in the horizontal direction, as seen in a section.

Engaging and disengaging means 45 is implemented by a part of the holder member 36 and a part of the bracket 39 close to the base member 35. The means 45 consists of a flexible tongue 47 included in the holder member 36 and having a lug 46 at its end, and a hole (engaging portion) 48 formed in the bracket 39 and engageable with the lug 46.

As shown in FIG. 6 in a section, the lug 46 has an arcuate portion 46a on which the bracket 39 slides during its movement away from the stop 36b, and an inclined portion 46b on which the bracket 39 slides during its movement toward the stop 36b. The lug 46 is oriented perpendicularly to the direction in which a force for releasing the bracket 39 from the holder 36 and a force for restoring it act. In addition, the lug 46 is deformable perpendicularly to the side of the bracket 39 and that of the holder member 36 (to the right in FIG. 6). Hence, the force for disengaging the bracket 39 from the holder member 36 and the force for engaging the former with the latter are determined by the sectional shape of the lug 46, the amount of mating of the lug 46 with the hole 48, the length and thickness t of the tongue 47, and the material of the holder member 36.

Because the lug 46 on which the force for releasing the bracket 39 from the holder member 36 acts has the arcuate portion 46a, a force usually applied to the cover 34 for closing it does not release the bracket 39 from the holder member 36. More specifically, because a line tangential to the hole 48 and arcuate portion 46a and a line extending in the releasing direction make have a substantial angle therebetween, the component of the releasing force tending to cause the lug 46 to yield is reduced. If desired, the hole, or engaging portion, 48 may be replaced with a recess or a lug engageable with the lug 46.

As shown in FIGS. 2, 6, 7 and 8, a recess 36c is formed in the holder member 36. When the bracket 39 and holder member 36 are coupled to each other via the lug 46 and hole 48, the free end 39a of the bracket 39 is received in the recess 36c and held parallel to both sides of the holder member 36. Also shown in the figures are E-rings 49 and 50 for preventing the bracket 39 from slipping out of the shaft 38.

In operation, assume that a thin document is laid on the glass platen 33, and the cover 34 is closed. Then, the holder member 36 and bracket 39 are rotated counterclockwise, as shown in FIG. 3, about the boss 37 with the lug 46 mating with the hole 48 and with the bracket 39 engaging with the holder member 36 under the action of the spring 40. This causes the bottoms of the sleeves 41 and 42 to move toward each other while compressing the spring 44. At the same time, the slot 41b of the sleeve 41 is narrowed, and the force of the lugs 41a sliding on the sleeve 42 is increased. Consequently, the friction acting between the sleeves 41 and 42 is increased. Finally, the cover 34 is brought into close contact with the glass platen 33 with the intermediary of the document.

Regarding the positional relation between the point (boss 37) connecting the holder 36 and base member 35, the point engaging the sleeve 41 with the base member 35, and the point (shaft 43) connecting the sleeve 42 and shaft 43, the point engaging the sleeve 41 with the base member 35 is positioned above a line connecting the boss 37 and shaft 43, as stated earlier. Hence, the force of the spring 44 loaded between the sleeves 41 and 42 serves to press a document laid on the glass platen 33. As a result, the document is held in close contact with the glass platen 33 and eliminates the previously mentioned defective copies. In addition, because the holder 36 and the portion of the bracket 39 close to the base member 35 are engaged with each other via the lug 46 and hole 48, the rise of the base end 34a of the cover plate 34, i.e., hip-up is obviated.

Assume that the cover 34 is opened when a thin document is present on the glass platen 33 or when no documents are present on the glass platen 33. Then, the holder member 36 and bracket 39 are rotated clockwise, as viewed in FIG. 3, about the boss 37 away from the glass platen 33 with the lug 46 and hole 48 mating with each other. At this instant, the holder member 36 and bracket 39 are engaged with each other by the force of the spring 40. As a result, the bottoms of the sleeves 41 and 42 are moved away from each other while extending the compression spring 44. At the same time, the slot 41b is broadened, and the force of the lug 41a sliding on the sleeve 42 is reduced. This reduces the friction acting between the sleeves 41 and 42. When the cover 34 is released at a desired angular position, it is held stationary due to the balance between the moment of rotation acting toward the glass platen 33 and attributable to the weight of the cover 34, the forces of the springs 40 and 44, the force maintaining the lug 46 and hole 48 in engagement, and the friction between the sleeves 41 and 42.

Figure 9:
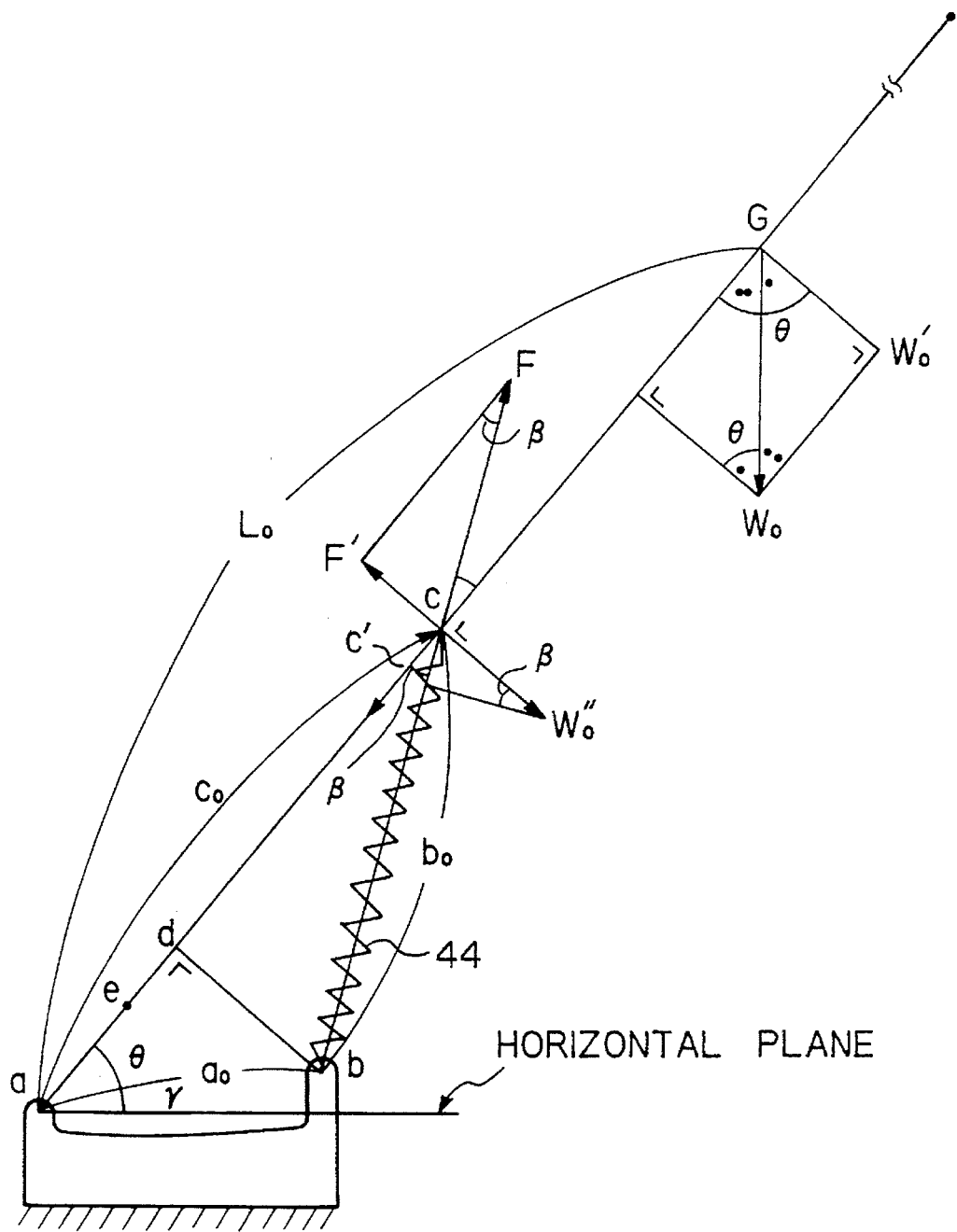
FIG. 9 is a diagram representative of a dynamic relation particular to the hinge mechanism.

A reference will be made to FIGS. 9 and 10 for describing the relation between the relative distance between the bottoms of the sleeves 41 and 42, the friction between the sleeves 41 and 42, and the force of the spring 44. Assume that the cover 34 has a weight $W_o$ and a center of gravity G, that the boss 37 about which the cover 34 is rotatable is represented by a, that the point of engagement of the inner sleeve 41 is b, and that the spring 44 supporting the cover 34 acts at a point c. Then, when a closing moment $M_c$ attributable to the weight $W_o$ and an opening moment $M_o$ attributable to a spring force F are brought out of balance due to the closing movement of the cover 34, a frictional force f between the sleeves 41 and 42 acts from the point b toward the point c. During the opening movement of the cover 34, the frictional force f reduces the spring force F. Assuming that the weight $W_o$ has a component $W'_o$ acting perpendicularly on the cover 34 at the point G, then the following equation holds:

$$W'_o = W_o \cos\theta \qquad \text{Eq. (1)}$$

where θ is the angle to which the cover 34 is opened.

In the above condition, assuming that the spring force F at the point c has a component F' perpendicular to the cover 34, then the component F' is expressed as:

$$F' = F_1 \sin\beta \qquad \text{Eq. (2)}$$

When the closing moment $M_c$ and opening moment $M_o$ acting about the point a are equal, the cover 34 is held in a given angular position. The moments $M_o$ and $M_c$ are produced by:

$$M_o = c_o \cdot F' = c_o \cdot F \sin\beta \qquad \text{Eq. (3)}$$

$$M_c = L_o \cdot W'_o = L_o \cdot W_o \cos\theta \qquad \text{Eq. (4)}$$

Therefore, assuming $M_o = M_c$, then $$c_o F \cdot \sin\beta = L_o \cdot W_o \cos\theta \; F = L_o / C_o \cdot W_o \cos\theta / \sin\beta \qquad \text{Eq. (5)}$$

Assuming a line b d extending through the point b and perpendicular to a side ac, then $$b_o \sin\beta a_o \sin(\theta - \gamma) \; \gamma = \text{constant}$$

Therefore, $$\sin\beta = a_o / b_o \cdot \sin(\theta - \gamma) \qquad \text{Eq. (6)}$$

As a result, the cosine rule gives:

$$b_o^2 = c_o^2 + a_o^2 - 2a_o \, c_o \cos(\theta - \gamma)$$

Therefore, $$b_o = \sqrt{a_o^2 + c_o^2 - 2a_o c_o \cos(\theta - \gamma)} \qquad \text{Eq. (7)}$$

By substituting the Eq. (7) for the Eq. (6), $$\sin\beta = \frac{a_o \sin(\theta - \gamma)}{\sqrt{a_o^2 + c_o^2 - 2a_o C_o \cos(\theta - \gamma)}} \qquad \text{Eq. (6)'}$$

By substituting the Eq. (6)' for the Eq. (5), $$F = \frac{L_o \cdot W_o \cdot \cos\theta \sqrt{a_o^2 + c_o^2 - 2a_o c_o \cos(\theta - \gamma)}}{c_o \cdot a_o \sin(\theta - \gamma)} \qquad \text{Eq. (5)'}$$

Figure 10:
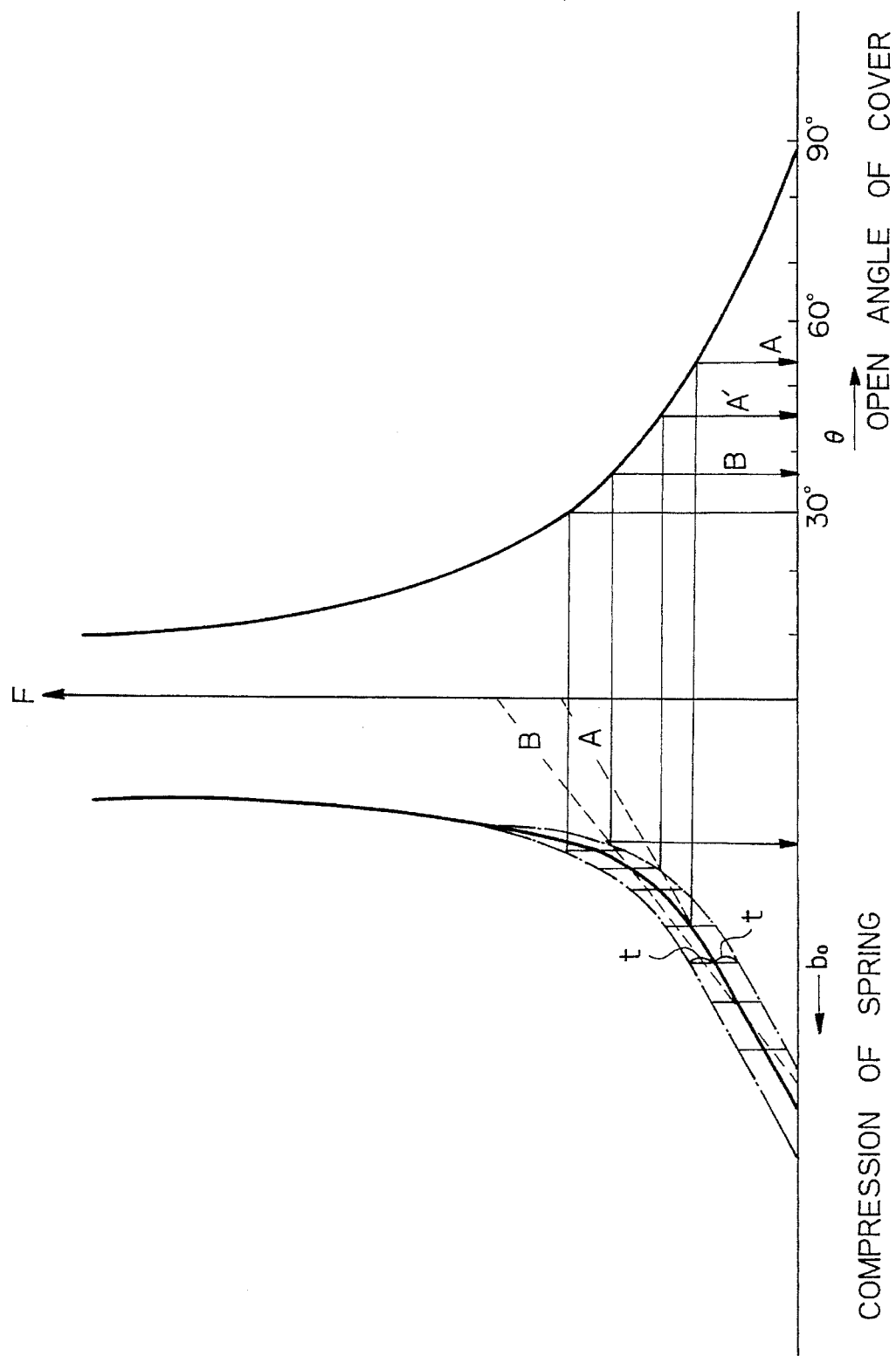
FIG. 10 shows a relation between the open angle of the cover and extension of first biasing means and the spring force.

FIG. 10 is a graph showing distances between the points F and $b_o$ (between the points b and c, i.e., the relative distance of movement of the sleeves 41 and 42) determined by varying the open angle represented by the Eq. (5)' and by preselecting the other constants. When the the cover 34 is about to move, the frictional force f between the sleeves 41 and 42 serves as a braking force. This is represented by dash-and-dot curves in FIG. 10. The relation between the force and the displacement of the spring 44 is indicated by a linear equation. Dashed lines A and B in FIG. 10 are representative of the actual forces of the spring 44. The spring 44 is selected in conformity to the curve of F as far as possible. When the force f is absent, the free stop range available with the cover is from 53 degrees to 90 degrees. By contrast, when the force f is reflected, the free stop range is broadened to from 45 degrees to 90 degrees, as indicated by A'. Further, when the force of the spring 44 is selected as indicated by B, a free stop range as broad as from 36 degrees to 90 degrees is achievable and noticeably enhances the manipulability of the cover 34 at the time of copying.

In the illustrative embodiment, the spring 44 is extended when the cover 34 is opened. At this instant, because the lug 35a of the base member 35 has a flat section longer in the horizontal direction (substantially coplanar with the glass platen 33) than in the vertical direction, as shown in FIG. 5, the spring 44 can be extended more than when the lug 35a has a circular section.

In FIG. 3, the cover 34 is shown in its full closed position. In this condition, the spring 44 is compressed and exerts a great force. Because the lug 35a of the base member 35 has a flat section, as stated above, the spring 44 can be compressed by an extra amount and, therefore, exerts a greater force. At this instant, the spring force F for generating the opening moment matching the closing moment attributable to the weight of the cover 34 is not represented by a linear equation; that is, it sharply increases with a decrease in the open angle θ, as a curve $b_o$-F of FIG. 10 indicates. In this condition, the frictional force f between the sleeves 41 and 42 and the flat section of the lug 35a derive the following advantages.

It is possible to broaden the range in which the frictional force f is balanced with the closing moment, and to reduce the required spring force F due to the unique section of the fulcrum b (lug 35a) of the base member 35. As a result, when the bottoms of the sleeves 41 and 42 are close to each, i.e., when the open angle θ of the cover 34 is small, the distance between the lug 35c and the end of the sleeve 42 can be reduced in order to increase the force of the spring 44. Hence, a great spring force is available when the open angle θ is small.

Further, when the bottoms of the sleeves 41 and 42 are remote from each other due to a great open angle θ, the distance between the lug 35a and the end of the sleeve 42 can be increased in order to reduce the force of the spring. Consequently, the free stop range of the cover 34 can be broadened.

The cover 34 is lifted up by the following procedure. As shown in FIG. 2, when a book or similar thick document P is laid on the glass platen 33, the bracket 39 is rotated counterclockwise about the shaft 38. Before the bracket 38 is rotated, the bracket 39 and holder member 36 extend substantially collinearly with each other and ready to rotate about the boss 37. Hence, the bracket 39 moves about the boss 37 together with the holder member 36 due to the force of the spring 40 and the force holding the lug 46 of the tongue 46 and the hole 48 in engagement. The torsion spring 40 generates an opening moment about the shaft 38 and intense enough to overcome the closing moment acting about the shaft 38 and attributable to the weight of the cover 34. Because the lug 46 on which the force for releasing the bracket 39 from the holder member 36 acts has the arcuate portion 46a, a force usually applied to the cover 34 for closing it does not release the bracket 39 from the holder member 36, as stated earlier. More specifically, because a line tangential to the hole 48 and arcuate portion 46a and a line extending in the releasing direction have a substantial angle therebetween, the component of the releasing force tending to cause the lug 46 to yield is reduced.

In the above condition, assume that the operator presses the cover 34 against the thick document P, as shown in FIG. 2. An upward rotating force, as viewed in FIG. 2, acts on the bracket 39 and causes it to rotate about the shaft 38 by being fulcrumed by the point where it contacts the edge P1 of the document P first. This upward force is intensified by the operator's hand pressing the cover 34. At this instant, as shown in FIG. 6, the upward force attributable to the bracket 39 acts on the arcuate portion 46a of the lug 46, so that the hole 48 exerts on the lug 46 a rightward force which reduces the amount of mating of the lug 46 with the hole 48. As a result, the lug 46 is elastically deformed until it has been released from the hole 48. This causes the bracket 39 to rotate counterclockwise, as viewed in FIG. 2, against the action of the spring 40. Hence, the bracket 39 is released from the holder member 36 with the result that the holder 36 slightly inclines. At the same time, the cover 34 is brought to a position substantially parallel to the document P and presses the document P evenly.

After a copying operation, the force being exerted by the operator's hand on the cover 34 is reduced in order to return the cover 34 to its original position. Then, the bracket 39 is rotated about the shaft 38 in the returning direction (counterclockwise in FIG. 2) until its end abuts against the inclined portion 46b of the lug 46. This is caused by the forces of the springs 40 and 44 and the force exerted by the operator to open the cover 34. Because the angle between the inclined portion 46b of the lug 46 and the returning force acting on the side of the bracket 39 is small, the force tending to cause the lug 46 to yield (perpendicular to the returning force; to the right in FIG. 6) increases. As a result, the lug 46 is caused to deform by the small returning force of the tongue 47 and is moved to the right as viewed in FIG. 6. Subsequently, the bracket 39 is restored to its original position where it abuts against the stops 36a and 36b of the holder 36, the lug 46 again mates with the hole 48, and the bracket 39 again engages with the holder member 36.

On the other hand, when the lug 46 is disengaged from or engaged with the hole 48, it slides on the side of the bracket 39 and exerts a reaction. As a result, in the event of release and return, a leftward force is generated as viewed in FIG. 6 and causes the side of the bracket 39 where the hole 38 is formed to deform to the left as viewed in FIG. 6. In FIG. 1, the right and left brackets 39 are respectively deformed to the right and to the left away from the lugs 46 of the holder member 36. This reduces the amount of mating of the lug 46 with the hole 48 and, therefore, the forces engaging and returning the lug 46 and hole 48, while aggravating irregularities in the event of engagement and restoration. As a result, the force necessary for the operator to operate the cover 34 varies each time, causing the operator to feel uneasy.

In light of the above, the illustrative embodiment has the recess 36c formed in the holder member 36 in order to avoid the undesirable elastic deformation of the bracket 39. When the bracket 39 and holder member 36 are engaged with each other via the lug 46 and hole 48, the free end of the bracket 39 is received in the recess 36c and held in parallel to the opposite side walls of the holder member 36. This successfully prevents the bracket 39 from deforming away from the lug 46 and thereby maintains the lug 46 and hole 48 mated in a predetermined amount.

Further, the tangential angle of the portion where the arcuate portion 46a of the lug 46 and the hole 48 contact each other is maintained constant. Hence, the tongue 47 can be deformed in a constant amount and by a constant force. In this condition, the force for releasing the bracket 39 remains constant and allows, when the document P is thick, the operator to operate the cover 34 with a constant force. Of course, the edges of the bracket 39 and those of the hole 48 are rounded so as to insure smooth movement.

As stated above, the base end of the holder member 36 is pivotally engaged with the base member 35. The bracket 39 is pivotally connected to the other end of the holder 36 by the shaft 38. The bottom of the inner sleeve 41 is pivotally engaged with the lug 35a formed on the base member 35 and located closer to the glass platen 33 than the base end of the member 35. Further, the bottom of the outer sleeve 42 is pivotally connected to the free end of the bracket 39 such that it is positioned closer to the glass platen 33 than the shaft 38 about which the bracket 39 is pivotable. This configuration reduces the force necessary for the operator to operate the cover 34 when a thick document is laid on the glass platen 33, thereby enhancing the manipulability of the cover plate 34.

Specifically, when the cover 34 which is heavy is opened, a great moment tending to close the cover 34 acts about the shaft 38. This has customarily been coped with by increasing the force of the spring 44 and the force maintaining the lug 46 and hole 48 in the mating position. In the illustrative embodiment, the bracket 39 is pivotally connected to the other end of the holder 36 by the shaft 38 while the outer sleeve 42 is pivotally connected to the free end of the bracket 39 such that it is positioned closer to the glass platen 33 than the shaft 38 about which the bracket 39 is pivotable, as stated above. Hence, the force of the spring 44 acts, as a moment tending to open the cover 34, on the portion where the sleeve 42 and bracket 39 are connected. This generates a force tending to restore the bracket 39 to the closed position relative to the holder member 36. Consequently, the force of the spring 40 and the force maintaining the lug 46 and hole 48 in the mating position can be reduced, compared to the conventional scheme.

More specifically, referring again to FIG. 9, the closing moment $M_c$ of the cover 34 attributable to its own weight $W_o$ is related to the open angle $\theta$ of the cover 34, as follows:

$$M_c = W_o (L_o - c') \cos\theta$$

As the above equation indicates, the closing moment $M_c$ increases with a decrease in open angle $\theta$. A decrease in open angle $\theta$ causes the spring 44 to be compressed in a greater amount and to exert a greater force tending to return the bracket 39 toward the holder member 36. As a result, the force of the spring 40 and the force maintaining the lug 46 and hole 48 in the mating position can be reduced, compared to the conventional arrangement wherein the bracket and outer sleeve share a single point of rotation. Hence, the bracket 39 can be lifted up or restored by a minimum of force via the cover 34. This enhances the manipulability of the cover 34 when a thick document is copied.

The holder member 36 has the flexible lug 46 while the bracket 39 has the hole 48 capable mating with the lug 46. The lug 46 has a section including the arcuate portion 46a on which the bracket 39 slides when moved away from the holder member 36, and the inclined portion 46b on which the bracket 39 slides when moved toward the holder member 36. Hence, the lug 46 is prevented from easily slipping out of the hole 48, so that the bracket 39 and holder member 36 are surely held in their engaged position. As a result, when the cover 34 is closed, the base end 34a of the of the cover 34 is free from hip-up and allows the cover 34 to be stably closed.

When the cover 34 lifted up is returned to the original position, the side of the bracket 39 slides on the inclined portion 46b of the lug 46 and causes the lug 46 to noticeably deform. This prevents the bracket 39 from being caught by the holder member 36. Also, the noticeable deformation allows the lug 46 to mate with the hole 48 easily. The lug 46 can, therefore, be easily returned to the original position where it mates with the hole 48.

Figure 11:
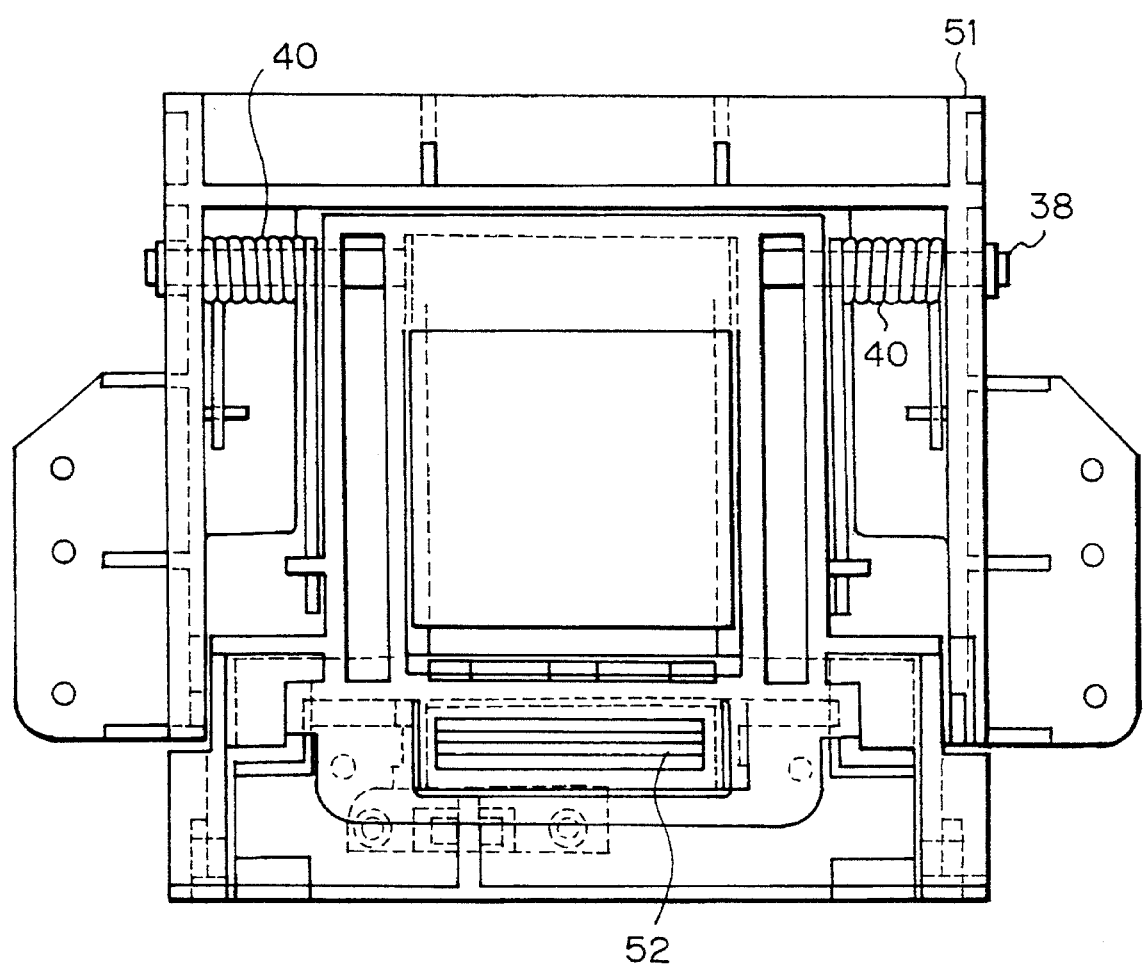
FIG. 11 is a front view showing an alternative arrangement of the hinge mechanism.
Figure 12:
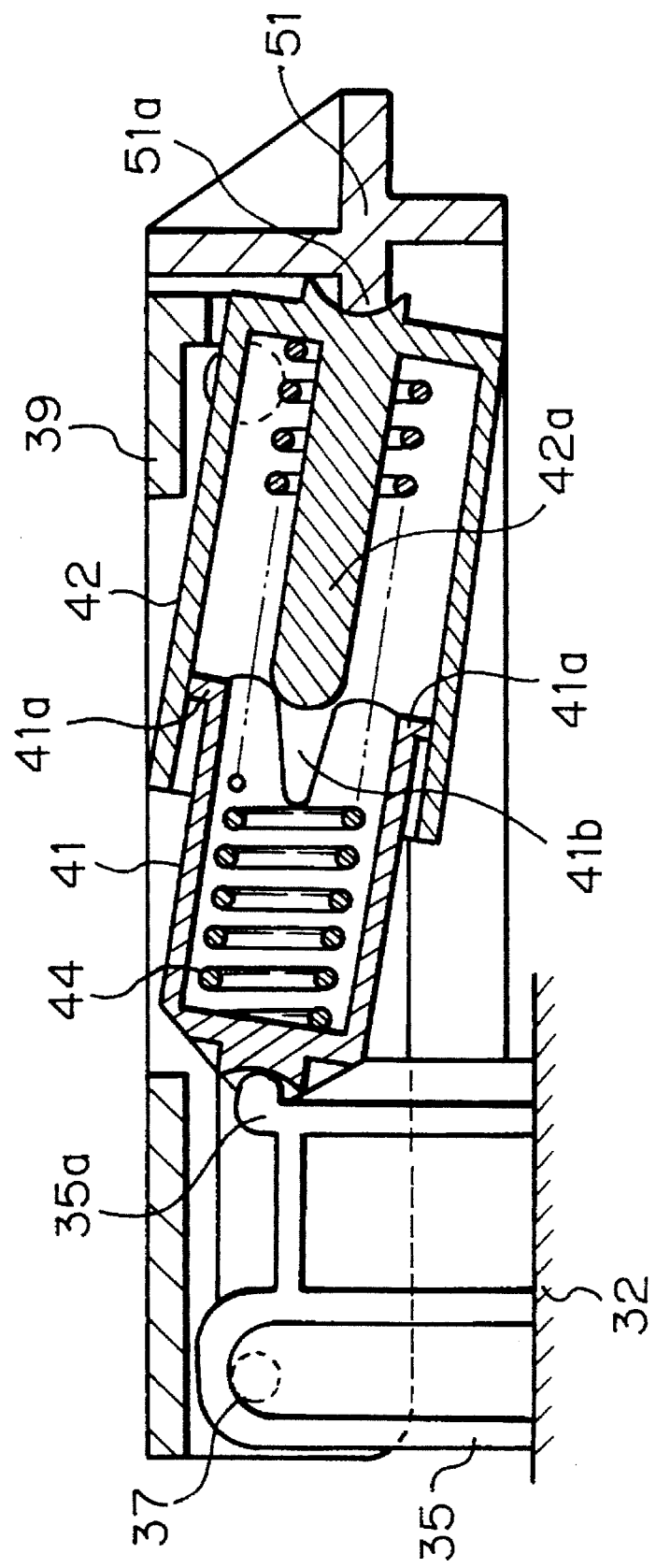
FIG. 12 is a sectional side elevation of the hinge mechanism shown in FIG. 11.

In the embodiment shown and described, the bracket 39 is implemented as a separate member, and the bottom of the outer sleeve 43 is pivotally connected to the shaft 43 spaced from the shaft 38 about which the bracket 39 is pivotable. FIGS. 11 and 12 show an alternative arrangement having a bracket 51 implemented as a single molding of resin and pivotally connected to the holder member 36 by the shaft 38. In this case, the bottom of the outer sleeve 42 is connected to a lug 51a provided on the inner periphery of the bracket 51. This alternative arrangement has the following advantages in addition to the advantages of the above embodiment. Because the sleeves 41 and 42 should only be respectively engaged with the lug 35a of the base member 35 and the lug 51a of the bracket 51, they are easy to mount and dismount. In addition, when the hinge mechanism 31 is disposed of, the spring 44 and the sleeves 41 and 42 made of resin can be easily removed and separated from each other. A magnet 52 and a magnet, not shown, are respectively affixed to the bracket 51 and holder member 36 in order to obviate hip-up. The magnets are substitutes for the hole of the bracket 51 and the lug of the holder member 36.

Figure 13A:
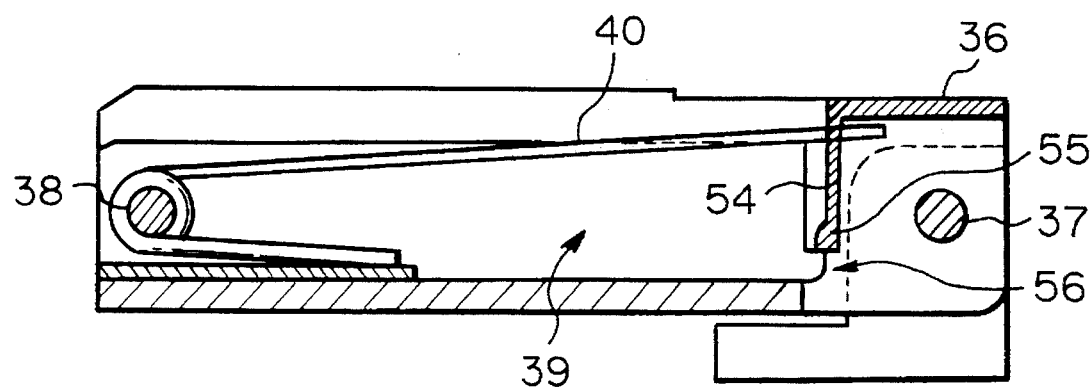
FIGS. 13A and 13B show an alternative arrangement for the engagement and disengagement of the holder member and bracket.
Figure 13B:
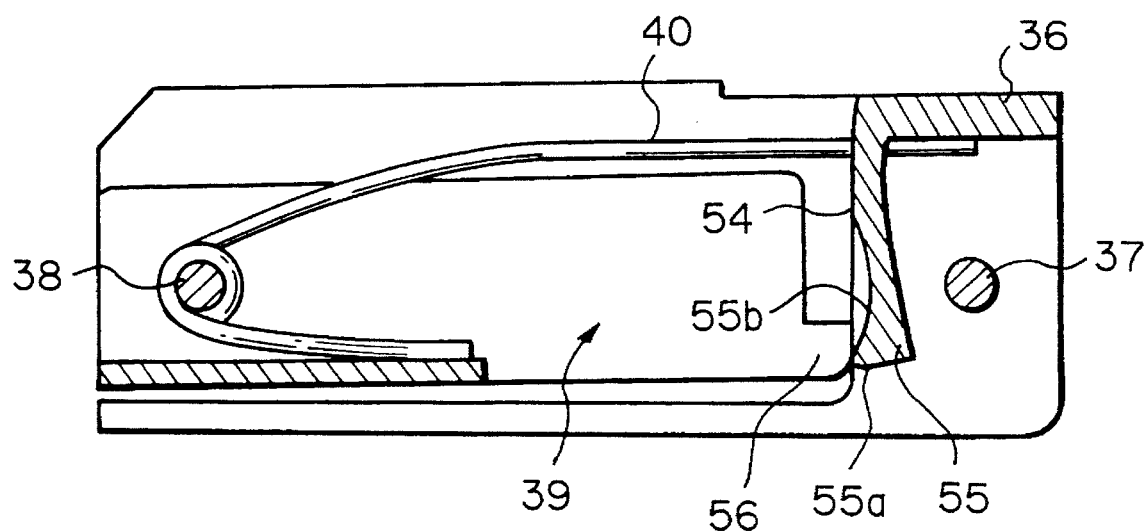

FIGS. 13A and 13B show a specific configuration replacing the lug and hole scheme stated above. As shown, the holder member 36 has a flexible downward extension 54 at its predetermined position. The extension 54 terminates at a lug 55. The bracket 39 has a lug 56 engageable with the lug 55. The lug 55 has a section including an arcuate portion 55a on which the bracket 39 slides when moved away from the holder member 36, and an inclined portion 55b on which the bracket 39 slides when moved toward the holder member 36. When the lug 56 is engaged with the lug 55a, the former is prevented from being easily released from the latter. As a result, when the cover 34 is closed, the base end 34a of the cover 34 is free from hip-up and allows the cover 34 to be stably closed.

Further, when the cover 34 lifted up is returned to the original position, the lug 56 slides on the inclined portion 55b of the lug 55, as shown in FIG. 13B. As a result, the the lug 55 is noticeably deformed and prevents the bracket 39 from being caught by the holder member 36. In addition, because the lugs 55 and 56 face each other in the direction perpendicular to the axis of the shaft 38, the side of the bracket 39 is prevented from being deformed by the lug 56 in the axial direction of the shaft 38. This makes it needless to form the recess 36c in the holder member 36.

In summary, it will be seen that the present invention provides a document pressing device having various unprecedented advantages, as enumerated below.

(1) While a closing moment acts on a cover about a point pivotally supporting the cover (bracket), a first biasing member loaded between a first and a second sleeve member exerts a force on a portion where the second sleeve member and bracket are connected as an opening moment. Hence, a force tending to return the bracket to its closed position acts on a holder member. This reduces the force required of a second biasing member and the force required of engaging and disengaging members. Consequently, when the bracket is lifted up or restored to its original position, it can be operated by a minimum of force via the cover. This enhances the manipulability of the cover and is particularly true when the cover covers a thick document.

(2) When the bracket is moved away from the holder member, it slides on an arcuate surface included in an engaging portion. This prevents a lug included in the holder member from being easily released from the engaging portion. As a result, the engagement of the bracket and holder member is insured and frees the base end of the cover from hip-up when the cover is closed. The cover can, therefore, be brought to the closed position in a stable manner.

(3) The bracket slides on an inclined surface also included in the engaging portion when it is moved toward the holder member. Hence, when the cover is restored form the lift-up position, the side of the bracket slides on the inclined surface while noticeably deforming the lug. This prevents the bracket from being caught by the holder member. In addition, such deformation allows the lug to easily mate with the engaging portion and allows the cover to be readily restored to the original position.

(4) When the lug of the holder member is engaged with or disengaged from the engaging portion of the bracket, the bracket is elastically deformed by the lug and prevents the distance between the bracket and the holder member from increasing. This maintains the deformation of the lug constant and thereby obviates irregularities in the engaging and disengaging forces to act between the lug and the engaging portion. As a result, the operator is free from uneasy feelings when lifting up the cover or restoring it to the original position.

(5) When the open angle of the cover is small and the bottoms of the first and second sleeve members are close to each other, the distance between the lug and the end of the second sleeve member can be reduced, increasing the spring force of the first biasing member.

(6) When the open angle of the cover is great and the bottoms of the first and second sleeve members are remote from each other, the distance between the lug and the second sleeve member can be increased, reducing the spring force of the first biasing member. This provides the first biasing member with a broader range of forces relative to the open angles of the cover, thereby broadening the free stop range of the cover.

Various modifications will become possible for those skilled in the art after receiving the teachings of the present disclosure without departing from the scope thereof.

What is claimed is:

1. A document pressing device for a copier, comprising:

a cover disposed above a document table of said copier, and for pressing a document laid on said document table;

at least one hinge mechanism provided at a base end of said cover, and openably supporting said cover on a housing of said copier, said hinge mechanism comprising:

a holder member pivotally engaged at a base end with a base member mounted on said housing;

a bracket pivotally connected to the other end of said holder member;

a first hollow cylindrical sleeve member having a bottom, and pivotally engaged at said bottom with a portion of said base member closer to said document table than said base end of said holder member;

a second hollow cylindrical sleeve member having a bottom, and telescopically coupled over said first sleeve member, and pivotally engaged with or connected to a free end of said bracket such that said second sleeve member is positioned closer to said document table than a point about which said bracket is pivotable;

a plurality of lugs formed at an open end of an outer periphery of one of said first and second sleeve members, and slidably contacting an inner periphery of the other of said first and second sleeve members;

a notch formed in one of said first and second sleeve members from said open end toward said bottom over a predetermined length;

first biasing means loaded between said bottoms of said first and second sleeve members, and for constantly biasing said first and second sleeves away from each other;

second biasing means loaded between said bracket and said holder member, and for constantly biasing said bracket toward said holder member such that when said cover is moved toward or away from said document table, said bracket does not pivotally move about said point relative to said holder member; and engaging and disengaging means constituted by a part of said bracket and a part of said holder member, and for causing said bracket to engage with said holder member such that said bracket is movable together with said holder member, and for causing, when a relatively thick document is laid on said document table, said bracket to disengage from said holder member when said bracket is pivotally moved about said point in interlocked relation to a closing movement of said cover and then released from said holder to cause said cover to be lifted up in accordance with a thickness of said document.

2. A device as claimed in claim 1, wherein said engaging and disengaging means comprises a flexible lug formed on said holder member, and an engaging portion formed on said bracket and engageable with said lug, and wherein said lug has a section including an arcuate portion on which said bracket slides when moved away from said holder member, and an inclined portion on which said bracket slides when moved toward said holder member.

3. A device as claimed in claim 1, wherein said holder member is formed with a recess for receiving, when said bracket is engaged with said holder member by said engaging and disengaging means, the free end of said bracket which is parallel to both sides of said holder member.

4. A device as claimed in claim 1, wherein a surface of said base member engaged with said bottom of said first sleeve member has a flat lug-like section longer in a horizontal direction than in a vertical direction, and wherein a surface of said first sleeve engaged with said lug of said base member has a section having a curvature equal to or greater than a curvature of a horizontal contact surface of said lug.

* * * * *